United States Patent Office 3,829,501
Patented Aug. 13, 1974

3,829,501
POLYETHERPOLYTHIOLS, METHOD OF PREPARATION AND MIXTURES OF POLYTHIOETHER-POLYTHIOLS WITH EPOXIDE RESINS
Richard A. Hickner, Midland, Mich., assignor to The Dow Chemical Company, Midland, Mich.
No Drawing. Continuation of abandoned application Ser. No. 771,648, Oct. 29, 1968. This application Aug. 12, 1971, Ser. No. 171,333
Int. Cl. C07c 149/00
U.S. Cl. 260—609 D
36 Claims

ABSTRACT OF THE DISCLOSURE

Polythioetherpolythiols with a thiol functionality greater than 2 are made by reacting a polythiol with a triene, a tetraene or mixtures thereof or mixtures of the polyenes with a diene, in the presence of a free radical generating catalysts. The polythioetherpolythiols can be reacted with epoxide resins to effect cures of the latter.

This application is a continuation of application Ser. No. 711,648, filed Oct. 29, 1968, now abandoned.

SUMMARY OF THE INVENTION

This invention relates to new polythioetherpolythiols which are made by reacting a dithiol with a compound having 3 to 5 olefinically unsaturated linkages or groups, or a mixture of at least one of said compounds with a diolefinically unsaturated compound preferably in the presence of a free-radical initiating catalyst. The new polythioetherpolythiols have a thiol functionality greater than 2.05 and preferably have a functionality of 2.2 to 4.

The new compounds can be aliphatic, or they can contain cycloaliphatic, or aromatic groups.

The polyene reactant can be derived from an aliphatic hydrocarbon, an aromatic hydrocarbon such as a phenyl, biphenyl or naphthyl group, an alkylidene biphenyl group, a poly(vinyl) or polyallyl ether of a polyol having 3 to 12 C atoms and 3 or more vinyl or allyl ether groups, a heterocyclic N containing group, or an oxygenated pentavalent P group. The unsaturated group can be attached to any of the above groups either through a carbon or through an oxygen linkage.

DETAILED DESCRIPTION OF THE INVENTION

Polythioetherpolymercaptans having an average of from about 2.05 to 4 or more thiol groups per molecule have been unknown prior to this invention. I have found that a very wide variety of polythioetherpolymercaptans can be made by reacting one or a mixture of polyenes with one or a mixture of polymercaptans, in a molar ratio such that there are more mercapto groups in the reaction mixture than carbon to carbon double bonds, in the presence of a free radical inititor as a catalyst. The polymercaptan will add across the carbon to carbon double bond and terminate in a free mercapto group.

The individual polyenes which can be reacted have at least 3 olefinically unsaturated sites. Alternatively, mixtures of such polyolefinically unsaturated compounds with diolefins or more highly unsaturated olefins can be employed to make the new compositions of the invention. The polyenes may contain other groups which are non-reactive with thiol or olefinic groups such as hydroxyl, chloro, bromo, cyano, carboalkoxy, or carbamido.

The polymercaptans can contain form 2 to 4 mercapto groups. The polymercaptan can be a aliphatic, cycloaliphatic, aromatic or heterocyclic. The carbon atoms in the aliphatic, cycloaliphatic, aromatic or heterocyclic polymercaptans can be substituted with any other group which will not react with the olefinic unsaturation. Thus, the substituents can be halogens, alkyl groups, alkoxy groups, aroxy groups, or cyano groups.

Representative polymercaptans have the generic formula $Y(SH)_n$ where Y is the non-reactive portion of the molecule and $n$ is an integer of 2 to 4 as defined above. Typical polymercaptans include ethanedithiol, propanedithiols, butanedithiol, pentanedithiol, hexanedithiol, heptanedithiols, octanedithiols, nonanedithiols, decanedithiols, benzene dithiols, tolyl dithiols, xylyl dithiols, cyclohexyl dithiols, ethyl cyclohexyldithiol, $\alpha,\alpha'$-dimercapto-p-xylene, $\beta,\beta'$-dimercaptodiethylether, $\beta,\beta'$-dimercaptodiethylsulfide.

Typical trienes which can be employed include 1,2,4 trivinylcyclohexane, triallylcyanurate, triallylisocyanurate, triallylphosphite, triallylphosphate, 1,2,3 triallyloxypropane, triallyl ethers of trimethylolpropane or pentaerythritol, 2,6-diallyl-1-allyloxybenzene, 1-allyloxy-2,4-diallyl-6-methoxybenzene, triallyltrimesate, triallylacetyl citrate or any other triene having up to 30 C atoms.

Representative tetraenes include 1,4 diallyloxy-2,5-diallyl benzene, 2,2'bis(4-allyloxy - 3 - allylphenyl)propane, tetraallyl ether of pentaerythritol, 1,3-diallyloxy-4,6-diallylbenzene.

Examples of dienes which can be utlized as coreactants with the trienes or tetraenes include 1,5-hexadiene, 4-vinylcyclohexene, d-limonene, dipentene, divinylbenzene, diallyl ethers of polyhydric alcohols containing from 2-10 carbon atoms such as a diallyl ether of glycerol, a diallyl ether of pentaerythritol, the diallyl ether of ethylene glycol, diallyl phthalate, or diallyl adipate.

The reaction can be initiated by any free-radical source, such as the organic peroxides or hydroperoxides, examples of which are benzoyl peroxide or t-butyl hydroperoxide, the azonitriles, such as azoisobutyronitrile or, if catalyst contaminants are to be avoided, the initator can be a radiation source such as ultraviolet light or gamma radiation, such as a cobalt 60 source. If the radiation sources are used as catalysts, the reaction can be run at ambient temperature, but with peroxides, hydroperoxides or azonitriles the reaction temperature must be approximately the decomopsition temperature of the organic catalyst. Generally a temperature range of from 50 to 150° C. can be used, depending primarily on the catalyst used.

The reaction can be carried out at atmospheric pressure, under a superimposed pressure or under vacuum. Since pressure appears to have no effect on the reaction, it is preferred to operate at ambient pressure at the reaction temperature used.

Because of the complexity of the reaction, the exact structure of the final products is not known with certainty. Thus, for example, if trivinyl cyclohexane is reacted with ethanedithiol the following courses could result.

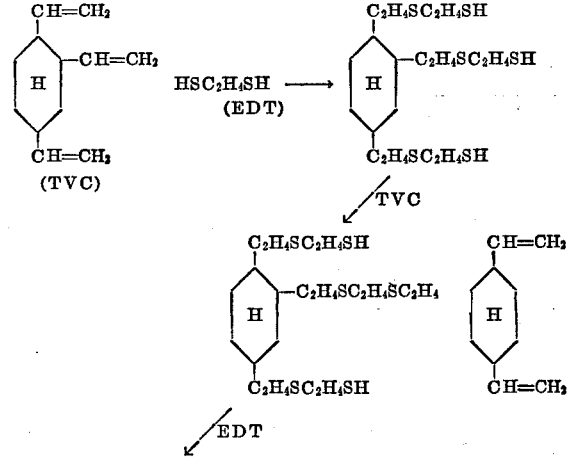

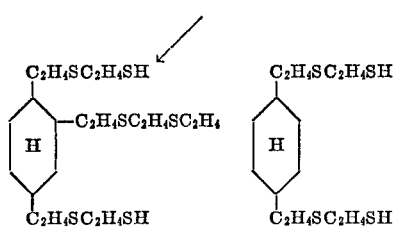

With other trienes or tetraenes some telemorization can also occur by bridging of two or more molecules of the triene or tetraene through a thioether linkage.

The higher the equivalent ratio of dithiol the more tri(thioetherthiol) will be formed. In practice, however, some of the higher molecular weight products will also be formed.

The proportions of the reactants can vary somewhat, but it is preferable to have at least 1.1 equivalent of —SH per double bond, and up to about 10 equivalents of —SH per double bond. Higher molar —SH ratios can be used but they will not react and serve only as diluents. In running the reaction it is preferable to add the triene or tetraene or mixture thereof or mixtures containing a diene to the polythiol. However, the polyene and the polythiol can be added simultaneously into the reaction chamber, if desired.

The products formed are all liquids having viscosities from about 2 poise up to such high viscosity that measurement with a Gardner viscometer cannot be made.

The examples which follow are intended to illustrate, but not to limit the invention. All parts are by weight unless otherwise indicated.

EXAMPLE 1

A two liter round-bottomed flask was charged with 643 parts of 1,2-ethanedithiol and 1 part of azobisisobutyronitrile. The mixture was heated to 70° C. and 185 parts of 1,2,4-trivinylcyclohexane were added slowly over a four hour period. An additional part of azobisisobutyronitrile was added and the mixture was held at 70° C. for nine more hours. The product was charged to a flash still and 338 parts of unreacted ethanedithiol were removed by distilling to a pot temperature of about 100° C. at 0.1 mm. pressure. The residue was filtered to yield 448 parts of a product analyzing 15.6% —SH. It had a Gardner viscosity of X or about 12.9 poise.

EXAMPLE 2

The procedure employed in preparing polythioetherpolymercaptans was the same as that described in Example 1.

Tabulated below are the data obtained from several runs, using various trienes and tetraenes with ethanedithiol and propanedithiol. Viscosity data, percent total sulfur, and SH equivalent weight are included in the table.

TABLE I

| Olefin | | Ethanedithiol, grams | Yield of product, grams | Viscosity, poise | —SH, eq. wt. | Percent S by wt. | —SH |
|---|---|---|---|---|---|---|---|
| Grams | Name | | | | | | |
| 243 | 1,2,4-trivinylcyclohexane | 848 | 640 | | | | |
| 185 | do | 643 | 450 | 12.9 | 206 | | 16.0 |
| 182.5 | {1,2,4-trivinylcyclohexane | 964 | 467 | 8.5 | 180 | | 18.0 |
|  | {do | 188 | 130 | 12.9 | 200 | 40.4 | 16.6 |
| 40.5 | 1,4-diallyloxy-2,5-diallylbenzene | 180 | 68 | ~32 | 241 | 33.6 | 13.7 |
| 28.1 | 2,2'-bis(4-allyloxy-3-allylphenyl) propane | 56 | 45 | (*) | 306 | 26.9 | 10.8 |
| 83 | Triallylcyanurate | 188 | 147 | ~123 | 223 | 33.0 | 14.8 |
| 80 | Triallylisocyanurate | 188 | 142 | (*) | 252 | 31.9 | 13.1 |
| 69 | Trivinylisocyanurate | 188 | 140 | (*) | 225 | 34.2 | 14.7 |
| 73 | Triallylphosphate | 188 | 134 | ~25 | 227 | 34.5 | 14.6 |
| 71 | 1,2,3-triallyloxypropane | 189 | 154 | 2.15 | 192 | 36.3 | 17.15 |
| 178 | 1,2,3-triallyloxypropane | 235 | 354 | 12.9 | 252 | 35.6 | 13.1 |
| 142 | do | a 414 | 335 | 2.9 | 246 | 34.2 | 13.4 |
| 98 | do | b 283 | 200 | 2.0 | 212 | 33.8 | 15.6 |
| 214 | 2,6-diallyl-1-allyloxybenzene | 564 | 444 | 10.7 | 206 | 35.0 | 16.0 |
| 271 | Allyl ether of pentaerythritol having an average of 3.29 allyl groups | 619 | 541 | | 225 | 33.5 | 14.7 |
| 270 | Allyl ether of pentaerythritol having an average of 3.77 allyl groups | 658 | 563 | | 228 | 35.2 | 14.5 | a 1,3-propanedithiol used.
b 1,2-propanedithiol used.
*Very viscous.

TABLE II

| Olefin A (moles) | Olefin B (moles) | Moles HSCH₂CH₂SH | Wt. of prod. (g.) | Viscosity, poise | —SH, eq. wt. | Analysis, percent | |
|---|---|---|---|---|---|---|---|
| | | | | | | S | SH |
| 4-vinylcyclohexene (0.30) | Triallylcyanurate (0.30) | 3.0 | 226 | ~17.6 | 206 | 36.4 | 16.0 |
| d-limonene (0.30) | do | 3.0 | 225 | 22.7 | 219 | 34.3 | 15.1 |
| 4-vinylcyclohexene (0.25) | 1,2,4-trivinylcyclohexane (0.375) | 1.0 | 145 | (*) | | | |
| d-limonene (0.25) | 2,2'-bis(4-allyloxy-3-allylphenyl) propane (0.25) | 2.7 | 236 | 98.5 | 245 | 31.0 | 13.5 |
| d-limonene (0.375) | 2,2'-bis(4-allyloxy-3-allylphenyl) propane (0.125) | 2.5 | 183 | 10.7 | 220 | 32.8 | 15.0 |
| 1,2,3-triallyloxypropane (0.50) | 2,2'-bis(4-allyloxyphenyl)-propane (0.50) | 5.0 | 414 | 7.0 | 228 | 30.0 | 14.5 |
| 1,2,3-triallyloxypropane (0.33) | 2,2'-bis(4-allyloxy-3-allylphenyl) propane (0.33) | 4.0 | 371 | 32.0 | 231 | 32.8 | 14.3 |

*Very viscous.

The polythioetherpolythiols described herein are useful for curing epoxide resins. In each of the following tests a reaction product of a triene or tetraene or mixtures with a diene and ethanedithiol was blended in equivalent amounts with a diglycidyl ether of bisphenol A having an epoxide equivalent weight of about 190. Tabulated below are data obtained on 15 mil thick films. Where cure did not begin immediately on mixing, the films were held at 40° F. until set.

TABLE III

| Polyene reacted with dithioethane | Wt. poly-thioether-polythiol, g. | SH, eq. wt. | Wt. diglycidyl ether of bisphenol A, g. | Cure catalyst, g. | Cure time, minutes |
|---|---|---|---|---|---|
| 1,4-diallyloxy-2,5-diallyl benzene | 28.0 | 241 | 22.0 | *.66 | 165 |
| Triallylisocyanurate | 28.5 | 252 | 21.5 | *.65 | 1,140 |
| Do | 28.5 | 252 | 21.5 | **.65 | ***3 |
| Triallylcyanurate | 27.0 | 223 | 23.0 | **.69 | ***5 |
| Trivinylisocyanurate | 27.1 | 225 | 22.9 | **.69 | (†) |
| 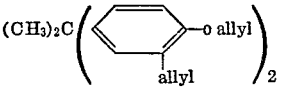 plus d-limonene (50/50 mol percent) | 28.2 | 245 | 21.9 | **.66 | 11 |
| Triallylcyanurate plus d-limonene (50/50 mol percent) | 26.7 | 219 | 23.3 | **.70 | 13 |
| Triallyl cyanurate plus 4-vinylcyclohexane (50/50 mol percent) | 26.0 | 206 | 24.0 | **.72 | 12 |
| Triallyloxypropane plus 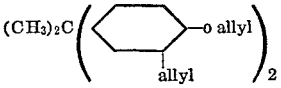 (50/50 mol percent) | 27.7 | 237.4 | 22.3 | **.67 | 15 |
| Triallyloxypropane | 25.1 | 192 | 24.9 | **.75 | 11 |

*Benzyl dimethyl amine.
**Tetramethyl guanadine.
***Started to exotherm in bottle while mixing.
†Cured while mixing.

The cured films adhere well to glass, wood, or metal and thus can be used for coatings or for making self-supporting sheeting.

In another series of tests, bars ½ inch x ½ inch x 5 inches were prepared by mixing .75 equivalent of a diglycidyl ether of bisphenol A, having an epoxide equivalent weight of about 190, with an equivalent amount of a polythioetherpolythiol. The curing catalyst in all instances was benzyl-dimethylamine. The cure temperature was ambient. Tabulated below are the polymers reacted with a dithiol and the properties of the bars which resulted.

TABLE IV

| Polyene reacted | Dithiol | SH, eq. wt. | Shore A hardness | Physical properties |
|---|---|---|---|---|
| Triallyloxypropane | $HSC_2H_4SH$ | 183 | 70 | Flexible. |
| Triallyloxypropane plus diallyl ether of bis-phenol A (50/50 mol percent). | $HSC_2H_4SH$ | 228 | 65 | Very flexible. |
| Triallyloxypropane plus 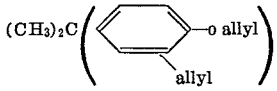 (50/50 mol percent). | $HSC_2H_4SH$ | 231 | 98 | Slightly flexible, very tough. |
| Triallyloxypropane | $HSCH_2\overset{CH_3}{\underset{|}{C}}HSH$ | 212 | 62 | Very flexible. |
| Do | $HSC_2H_4SH$ | 252 | 69 | Flexible. |
| Do | $HS(CH_2)_3SH$ | 246 | 71 | Do. | ene group, a tolylene group, a xylylene group, a cyclohexyl group, an ethylcyclohexyl group, a

group, a $-(CH_2)_2O(CH_2)_2-$ group or a $$-(CH_2)S(CH_2)_2$$

group, in a ratio so as to provide at least 1.1 —SH equivalent per unsaturated group of (A), the reaction product being a polythioether polythiol having a thiol functionality greater than 2.05, the said reaction being carried out in the presence of a free radical generating catalyst.

2. The product of Claim 1 in which the compound of (A) is triallyloxypropane.

3. The product of Claim 2 in which $Y(SH)_n$ is a saturated aliphatic thiol of 2–4 C atoms.

4. The product of Claim 3 in which $Y(SH)_n$ is ethanedithiol.

5. The product of Claim 1 in which the compound of (A) is an allyl ether of a polyol having 3–12 C atoms and at least 3 allylether groups.

6. The product of Claim 5 in which the allyl ether is a polyallyl ether of pentaerythritol having an average of more than 3 allyl groups per pentaerythritol molecule.

7. The product of Claim 6 in which $Y(SH)_n$ is ethanedithiol.

8. The product of Claim 5 in which $Y(SH)_n$ is ethanedithiol.

I claim:

1. The liquid reaction product of at least one of (A)(1) at least one polyallyl ether of a polyol having 3–12 C atoms and at least 3 allylether groups, (2) a compound having a benzene nucleus which has attached thereto 1 to 2 allyl and 1 to 2 allyloxy groups wherein the sum of the allyl and allyloxy groups is 3–4, (3) 2,2 bis(4-allyloxy-3-allylphenyl) propane, (4) trivinylcyclohexane, (5) triallylcyanurate, (6) triallylisocyanurate, (7) trivinylisocyanurate, (8) triallyltrimesate, (9) triallylacetylcitrate and up to 50 mol percent of a monomeric diene selected from 1,5-hexadiene, 4-vinylcyclohexene, d-limonene, dipentene, divinylbenzene, diallylethers of polyhydric alcohols containing from 2–10 C atoms and 2 to 4 OH groups, diallyl adipate and diallyl phthalate with (B) a polythiol of the formula $Y(SH)_n$ wherein $n$ is 2–4 and Y is selected from a saturated aliphatic hydrocarbon group having 2–10 C atoms, a phenyl- 9. The product of Claim 1 in which the compound (A) has a benzene nucleus having attached thereto 1 to 2 allyl and 1 to 2 allyloxy groups wherein the sum of the allyl and allyloxy groups is 3 to 4.

10. The product of Claim 9 in which the compound A is 2,6-diallyl-1-allyloxybenzene.

11. The product of Claim 10 in which $Y(SH)_n$ is ethanedithiol.

12. The product of Claim 9 in which the compound (A) is 1,4-diallyloxy-2,5-diallylbenzene.

13. The product of Claim 12 in which $Y(SH)_n$ is ethanedithiol.

14. The product of Claim 9 in which the compound A is 1,3-diallyloxy-4,6-diallylbenzene.

15. The product of Claim 14 in which $Y(SH)_n$ is ethanedithiol.

16. The product of Claim 1 in which the compound (A) is 2,2-bis(4-allyloxy-3-allylphenyl) propane.

17. The product of Claim 16 in which $Y(SH)_n$ is ethanedithiol.

18. The product of Claim 1 in which the compound (A) is trivinyl cyclohexane.

19. The product of Claim 18 in which $Y(SH)_n$ is ethanedithiol.

20. The product of Claim 1 in which the compound (A) is triallylcyanurate.

21. The product of Claim 1 in which $Y(SH)_n$ is ethanedithiol.

22. The product of Claim 1 in which the compound (A) is triallylisocyanurate.

23. The product of Claim 22 in which $Y(SH)_n$ is ethanedithiol.

24. The product of Claim 1 in which (A) is a mixture of a polyallyl ether of a polyol having 3–12 C atoms, and at least 3 allyl ether groups and a diene selected from 1,5-hexadiene, 4-vinylcyclohexene, d-limonene, dipentene, divinylbenzene, diallyl ethers of alcohols containing from 2–10 C atoms and 2 to 4 —OH groups, diallyl adipate and diallyl phthalate.

25. The product of Claim 24 in $Y(SH)_n$ is ethanedithiol.

26. The product of Claim 1 in which (A) is a mixture of trivinyl cyclohexane and a member selected from 1,5-hexadiene, 4-vinylcyclohexene, d-limonene, dipentene, divinylbenzene, diallylethers of polyhydric alcohols containing from 2–10 C atoms and 2–4 —OH groups, diallyl adipate and diallyl phthalate.

27. The product of Claim 26 in which $Y(SH)_n$ is a dithiol of from 2–3 C atoms.

28. The product of Claim 27 in which $Y(SH)_n$ is ethanedithiol.

29. The product of Claim 1 in which A is a mixture of a compound having a benzene nucleus which has attached thereto 1 to 2 allyl and 1 to 2 allyloxy groups and the sum of the allyl and allyloxy groups is 3 to 4 and a diene selected from the class of 1,5-hexadiene, 4-vinylcyclohexene, d-limonene, dipentene, divinylbenzene, diallyl ethers of polyhydric alcohols containing from 2–10 C atoms and 2–4 OH groups, diallyl adipate and diallyl phthalate.

30. The product of Claim 29 in which $Y(SH)_n$ is a dithiol of 2–3 C atoms.

31. The product of Claim 29 in which $Y(SH)_n$ is ethanedithiol.

32. The product of Claim 1 in which (A) is a mixture of triallyl isocyanurate and a diene selected from 1,5-hexadiene, 4-vinylcyclohexene, d-limonene, dipentene, divinylbenzene, diallyl ethers of polyhydric alcohols containing from 2–10 C atoms and 2 to 4 OH groups, diallyl adipate and diallyl phthalate.

33. The product of Claim 32 in which $Y(SH)_n$ is ethanedithiol.

34. The product of Claim 1 in which (A) is a mixture of triallyl cyanurate and a diene selected from 1,5-hexadiene, 4-vinylcyclohexene, d-limonene, dipentene, divinylbenzene, diallyl ethers of polyhydric alcohols containing from 2–10 C atoms and 2 to 4 OH groups, diallyl adipate and diallyl phthalate.

35. The product of Claim 34 in which $Y(SH)_n$ is ethanedithiol.

36. The product of Claim 2 in which $Y(SH)_n$ is 1,2-ethane dithiol and triallyloxypropane is the sole reactant of group (A), said product having about 35.6% by weight of S and about 13.1% of SH.

References Cited

UNITED STATES PATENTS

| | | | |
|---|---|---|---|
| 2,810,687 | 10/1957 | Rueggeberg | 260—607 A |
| 3,403,187 | 11/1964 | Oswald et al. | 260—609 R |
| 2,964,502 | 12/1960 | Wheelock | 260—609 R |
| 2,347,182 | 4/1944 | Coffman | 260—79 |
| 3,338,810 | 8/1967 | Warner | 260—607 A |
| 3,625,925 | 12/1971 | Oswald et al. | 260—609 R |
| 3,506,626 | 4/1970 | Warner | 260—79 |

OTHER REFERENCES

Marvel and Chambers: J. Amer. Chem. Soc., pp. 993–998, vol. 70, March 1948.

Marvel and Markhart: J. Amer. Chem. Soc., pp. 1064–1065, vol. 73, February 1951.

LEWIS GOTTS, Primary Examiner

D. R. PHILLIPS, Assistant Examiner

U.S. Cl. X.R.

260—79, 609 R, 609 B, 609 E

UNITED STATES PATENT OFFICE
CERTIFICATE OF CORRECTION

Patent No. 3,829,501            Dated August 13, 1974

Inventor(s) Richard A. Hickner

It is certified that error appears in the above-identified patent and that said Letters Patent are hereby corrected as shown below:

Col. 1, line 24, delete "711,648" and insert --771,648--

Col. 1, line 66, delete "form" and insert --from--

Col. 1, line 67, delete the word "a"

Col. 4, Table II, under the heading "Wt. of prod.(g.)", fifth line down, delete "183" and insert --189--

Col. 5, Table III, the column headed "Cure time, minutes", sixth line down, delete "11" and insert --13--

Col. 5, Table III, the column headed "Cure time, minutes", seventh line down, delete "13" and insert --11--

Col. 5, Table IV, delete the formula:

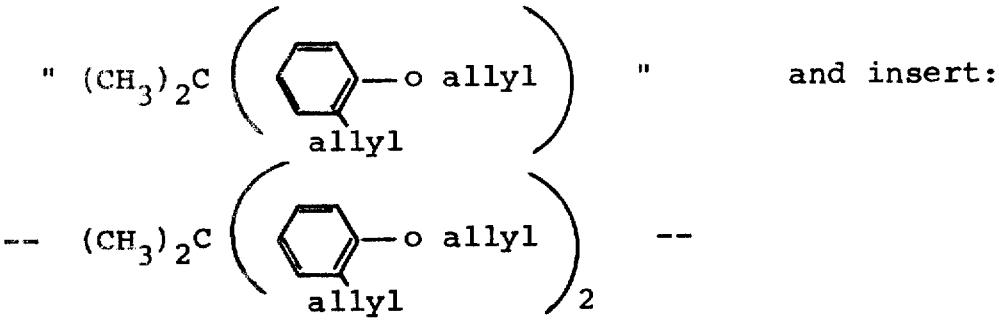

Col. 7, line 40, after the word "in" insert --which--

Signed and sealed this 5th day of November 1974.

(SEAL)
Attest:

McCOY M. GIBSON JR.            C. MARSHALL DANN
Attesting Officer               Commissioner of Patents